(12) United States Patent
Madiraju Varadaraju

(10) Patent No.: US 9,235,582 B1
(45) Date of Patent: Jan. 12, 2016

(54) TRACKING FILES EXCLUDED FROM BACKUP

(71) Applicant: EMC Corporation, Hopkinton, MA (US)

(72) Inventor: Kiran Kumar Madiraju Varadaraju, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 228 days.

(21) Appl. No.: 13/830,184

(22) Filed: Mar. 14, 2013

(51) Int. Cl.
*G06F 17/30* (2006.01)

(52) U.S. Cl.
CPC ................................ *G06F 17/30088* (2013.01)

(58) Field of Classification Search
CPC ............ G06F 2201/84; G06F 11/1469; G06F 11/1448; G06F 11/1446; G06F 17/30088
USPC .................................................. 707/614, 645
See application file for complete search history.

(56) References Cited

U.S. PATENT DOCUMENTS

| 6,157,931 | A  | * | 12/2000 | Cane et al. | |
|---|---|---|---|---|---|
| 8,117,492 | B1 | * | 2/2012 | Searls et al. | 714/6.13 |
| 2006/0123211 | A1 | * | 6/2006 | Derk et al. | 711/162 |
| 2010/0306486 | A1 | * | 12/2010 | Balasubramanian et al. | 711/162 |
| 2011/0307657 | A1 | * | 12/2011 | Timashev et al. | 711/112 |
| 2013/0018946 | A1 | * | 1/2013 | Brown et al. | 709/203 |
| 2013/0159646 | A1 | * | 6/2013 | Atzmon | G06F 11/1451 711/162 |

OTHER PUBLICATIONS

MSDN,"Excluding Files from Shadow Copies", Feb. 1, 2012, Microsoft, Build Date: Sep. 7, 2011, 3 pages.*

* cited by examiner

*Primary Examiner* — Rehana Perveen
*Assistant Examiner* — Alexander Khong
(74) *Attorney, Agent, or Firm* — Van Pelt, Yi & James LLP

(57) ABSTRACT

Techniques to exclude files from backup are disclosed. In various embodiments, a database that includes an exclude set table configured to store data associated with one or more files identified to be excluded from backup is accessed. Data retrieved from the database is used to exclude one or more of said one or more files from a backup. In some embodiments, files are excluded from the backup at least in part by deleting the files from a shadow copy volume created in connection with said backup.

17 Claims, 6 Drawing Sheets

TRACKING FILES EXCLUDED FROM BACKUP

BACKGROUND OF THE INVENTION

When backing up data it may be desirable to exclude certain files from being backed up. For example, if the backup is being performed to protect user data, such as files or other objects created by the user using one or more applications, it may be desirable to exclude operating system files from being backed up, to avoid using associated storage space for example. Or, in backing up virtual machine data it may be desirable to back up operating system and/or virtual machine state-related files but not application data, such as Exchange Server objects, which may already be backed up by another system and/or process.

In a file-based backup, typically a list of files to be excluded from the backup is created and used to skip the files on the exclude list as the backup application walks the file system to create the backup. In a block-based backup, by contrast, the backup is performed at the volume level and it is not as simple a matter to skip files on the exclude list. Instead, it is necessary to determine which blocks store file data and/or metadata associated with files to be excluded, and to omit those from the backup data. On incremental backup, moreover, it is necessary to determine which blocks modified on the source volume are associate with files (data and/or metadata) that have been excluded from the prior backup(s) and for consistency are desired to continue to be excluded from the current incremental backup. In addition, new, renamed, and/or relocated files to be excluded may have been identified since the full back and must reliably be excluded from any subsequent incremental or other backup.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to reliably exclude files from backups are disclosed. In various embodiments, a relational database (RDBMS) is used to identify files to be excluded and to keep track of which files have successfully been excluded from backup. A database is designed with tables to hold exclude file set items before and after exclusion. In various embodiments, the database is persistent and provides efficient storage and retrieval mechanisms. In various embodiments, standard SQL querying capabilities are may be used. In some embodiments, a light weight RDBMS engine called SQLITE is embedded in a backup application and/or components thereof to implement techniques described herein.

Figure 1:
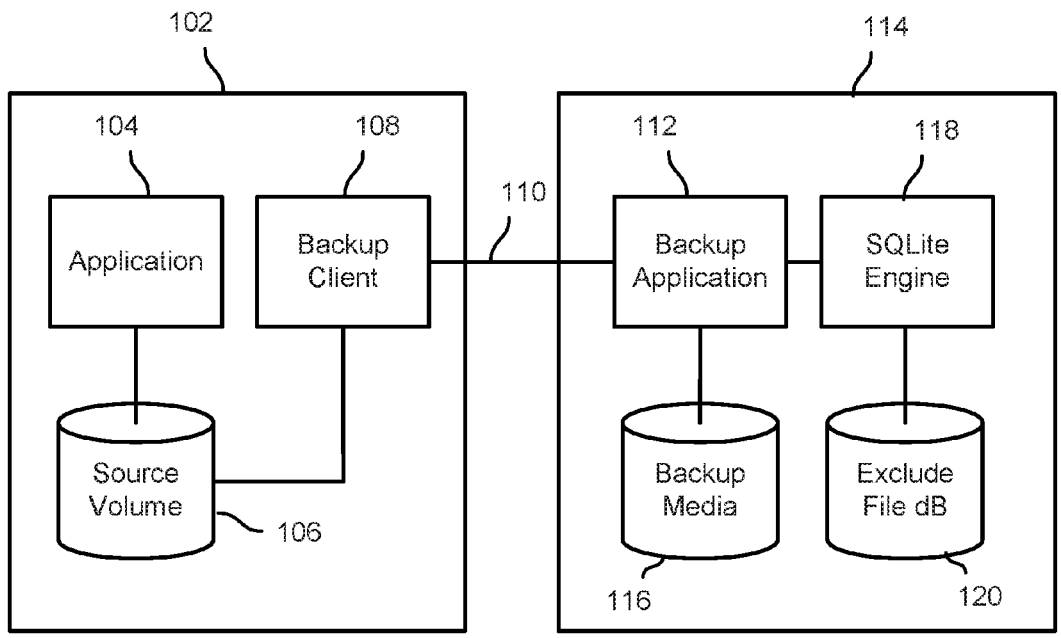
FIG. 1 is a block diagram illustrating an embodiment of a backup system and environment.

FIG. 1 is a block diagram illustrating an embodiment of a backup system and environment. In the example shown, a file or other production server 102 has an application 104 running on it. The application 104 creates, modifies, and deletes application objects, e.g., files, stored in a source volume 106 on server 102. A backup client 108 (or other agent) running on server 102 is configured to back up data stored in source volume 106. In the example shown, data to be backed up is read from source volume 106 by backup client 108 and sent over a network or other connection 110 to a backup application running on a backup server 114. Backup application 112 stores back up data from source volume 106 to backup media 116, e.g., to disk, tape, or other media. In some embodiments, a backup of source volume 106 may include a snapshot, such a shadow copy volume created using a virtual shadow copy service (VSS) of an operating system running on server 102, such as the Microsoft Windows® operating system. While the backup client (i.e., server 102) and backup application 112 are shown in FIG. 1 as residing on separate physical computer systems (servers) connected by connection 110, in other embodiments the backup application and/or one or more associated elements may be running on the same physical system on which the source volume is stored.

Referring further to FIG. 1, in the example shown backup application 112 is configured to exclude from backup data stored on backup media 116 files not desired (e.g., by a backup administrator or other user) to be backed up at least in part by deleting files to be excluded from a shadow copy volume stored on backup media 116. In the example shown, a SQLite or other RDBMS engine 118 embedded in and/or otherwise associated with backup application 112 is used to determine which files are intended to be excluded from backup and which files are in fact successfully excluded. One or more database tables are stored in an exclude file database 120. SQL statements are used to populate a table of files desired to be excluded, and at or after backup time to determine which files are to be deleted from backup data store on backup media 116, e.g., a shadow copy of a source volume such as source volume 106. In various embodiments, files successfully deleted from a shadow copy or other backup data are added to a list of files actually and successfully excluded from backup.

Figure 2:
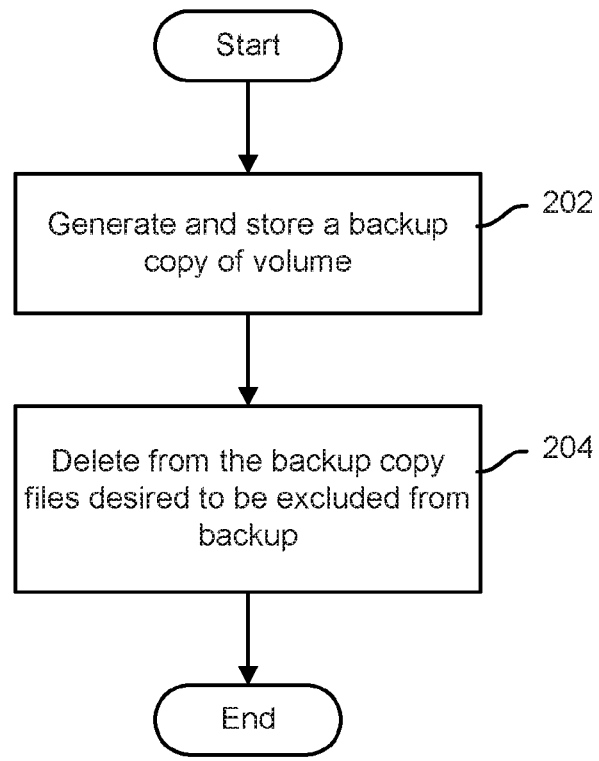
FIG. 2 is a flow chart illustrating an embodiment of a process to back up data.

FIG. 2 is a flow chart illustrating an embodiment of a process to back up data. In the example shown, a backup copy of a volume, such as a virtual shadow copy service (VSS) generated copy, is generated and stored on backup media (202). Files desired to be excluded from the backup are deleted from the shadow copy or other snapshot stored on backup media (204).

Figure 3:
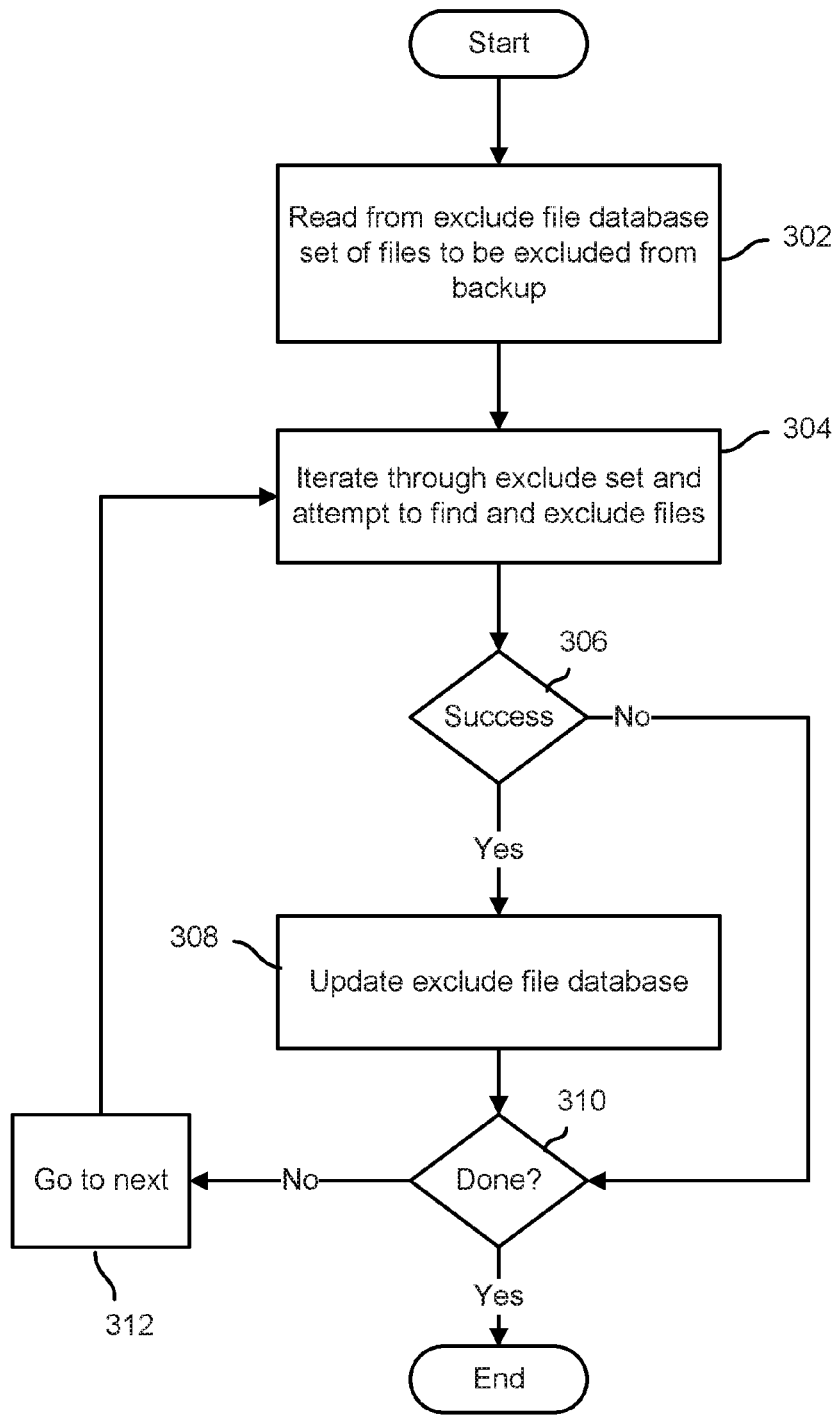
FIG. 3 is a flow chart illustrating an embodiment of a process to exclude files from backup.

FIG. 3 is a flow chart illustrating an embodiment of a process to exclude files from backup. In various embodiments, the process of FIG. 3 is included in step 204 of FIG. 2. In the example shown, a list of files to be excluded from backup is read from an exclude file database, e.g., database 120 of FIG. 1 (302). The exclude set is iterated through to attempt to exclude files on the list, e.g., by deleting them from a shadow copy of the source volume (304). If a file to be excluded is excluded successfully (306), the exclude file database is updated to reflect that the file was excluded (308). Once the database has been updated, or if the file could not be excluded, it is determined whether there are any more files to be excluded (310). If so, processing advances to a next file in the exclude set (312). Once all files have been processed, the process of FIG. 3 ends.

Figure 4:
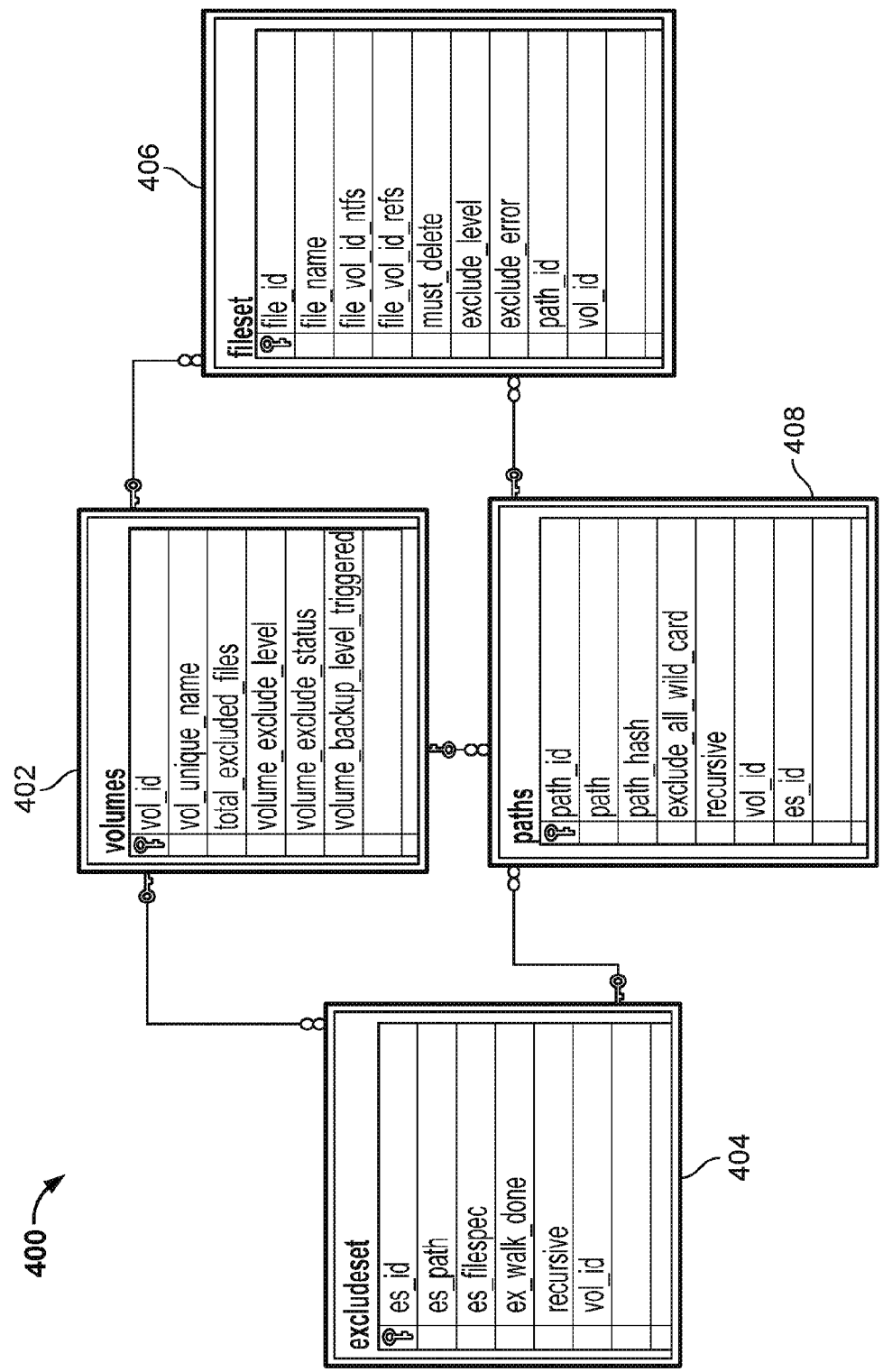
FIG. 4 is a block diagram illustrating an embodiment of a relational database to track excluded files.

FIG. 4 is a block diagram illustrating an embodiment of a relational database to track excluded files. In the example shown, the database 400 includes four tables, a volumes table 402 configured to store volume information and summary information regarding file exclusion (e.g., total number of files excluded); a excludeset table 404 configured to list files desired to be excluded from backup; a fileset table 406 configured to store data identifying files that have been excluded; and a paths table 408 configured to store path information associated with files that have been excluded.

In various embodiments, the volumes table 402 is configured to hold volume details such as internal name, total number of excluded files, exclusion status, backup level triggered, etc. It has a unique constraint on volume name to avoid duplicate records that hold the details of a particular volume. The excludeset table 404 in the example shown holds the items marked for exclusion that need to be excluded, for example from the VSS or other snapshot. The table is designed to hold multiple exclude set items pointing to multiple volumes. As a basic input an exclude set item may be described in various embodiments by the following tuple:
  Path (\Windows\Temp\)
  Filespec (*.txt)
  Recursive Boolean flag.
In some embodiments, the excludeset table 404 has a combined unique constraint on the above-mentioned fields thereby enabling a variety of files to be excluded within the same path. The same exclude set tuple can be specified for different volumes. To facilitate this in the example shown in FIG. 4 there is a foreign key field vol_id which is further added to the unique constraint along with the three fields just described.

The fileset table 406 in various embodiments is populated after exclusion. The table holds details of the files that are excluded, e.g., by a VSS writer program configured to delete exclude files from the backup. The paths table 408 is also populated after exclusion. It holds details of the path traversed during the exclusion process.

In various embodiments, the volumes table 402 has the following detailed structure:

| Field Name | Data Type | Use |
|---|---|---|
| Vol_id | INTEGER | Primary key; |
| Vol_Unique_name | TEXT | Internal unique name given by the OS to a particular volume |
| Total_excluded_files | INTEGER | Holds the count of excluded files for a particular volume. |
| Volume_exclude_level | INTEGER | Indicates the current exclude level |
| Volume_exclude_status | INTEGER | Used to denote the exclude status for a particular volume; status includes success, failure and fall back to full |
| Volume_backup_level_triggered | INTEGER | Denotes the backup level triggered before exclusion for a particular volume. |

In various embodiments, the excludeset table 404 has the following detailed structure:

| Field name | Data Type | Use |
|---|---|---|
| Es_id | INTEGER | Primary key auto generated sequential counter generated when record is inserted by sqlite engine. |
| Es_path | TEXT | Denotes the path of the exclude set item. Ex 1:\Windows\temp\ Ex 2:\dir1\dir2\ |
| Es_filespec | TEXT | Denotes the type of the file that needs to be excluded. Ex 1: *.txt Ex 2: *.mdf Ex 3: msdtc.log |
| Ex_walk_done | INTEGER | A Boolean flag which denotes whether the exclude set item is processed or not. 1 indicates it is processed. 0 indicates that it's a new exclude set item. This is used to identify/process new exclude set items added in between incremental backups. |
| Recursive | INTEGER | A Boolean flag which denotes whether the exclude set item needs to be processed recursively |
| Vol_id | INTEGER | Foreign key references volumes table; denotes to which volume the exclude set item belongs. |

In various embodiments, the fileset table 406 has the following detailed structure:

| Field Name | Data Type | Use |
|---|---|---|
| File_id | INTEGER | Primary key auto generated sequential counter generated when record is inserted by sqlite engine. |
| File_name | TEXT | Denotes the file name ex: abc.txt, xyz.jpg; |

-continued

| Field Name | Data Type | Use |
| --- | --- | --- |
| file_vol_id_ntfs | INT8 | Denotes the 64 bit unique number given by the NTFS filesystem. |
| file_vol_id_refs | INT8 | Denotes the 64 bit higher unique number given by the REFS filesystem. |
| must_delete | INTEGER | Denotes whether a particular file should be deleted to maintain image consistency in case of incremental backups. Default value is zero at the time of insertion |
| exclude_level | INTEGER | Indicates current exclude level for the particular file. Default level is 1 at the time of insertion |
| Path_id | INTEGER | Foreign key references paths table; denotes to which directory the file belongs. |
| Vol_id | INTEGER | Foreign key references volumes table; denotes to which volume the file belongs. |

In various embodiments, the paths table 408 has the following detailed structure:

| Field Name | Data Type | Use |
| --- | --- | --- |
| Path_id | INTEGER | Primary key auto generated sequential counter generated when record is inserted by sqlite engine. |
| Path | TEXT | Denotes the path of the exclude set item.<br>Ex 1:\Windows\temp\<br>Ex 2:\dir1\dir2\<br>Inserted only after processing the items present in the exclude set table and if there are valid file matches within that path. |
| Path_Hash | TEXT | The path component is hashed using MD5 algorithm for fast insertion. |
| Exclude_all_wild_card | INTEGER | A Boolean flag that denotes whether all items within the directory need to be excluded. |
| Recursive | INTEGER | A Boolean flag which denotes whether the exclude set item needs to be processed recursively |
| Vol_id | INTEGER | Foreign key references volumes table; denotes to which volume the path belongs. |
| Es_id | INTEGER | Foreign key references excludeset table; denotes to which exclude set item the path belongs. |

Referring further to the examples illustrated in the tables above, in various embodiments as files are excluded the fileset table 406 is populated with necessary entries. During the next backup the items are fetched through a simple SQL SELECT query, such as: SELECT '% ws'||b.path||c.file_name, c.file_id, c.file_vol_id_ntfs, c.file_vol_id_refs, c.must_delete from paths b INNER JOIN fileset c on b.path_id=c.path_id where b.vol_id=% d and c.exclude_level=% d and c.exclude_error=0;".

If there is any error during deletion operation then only during incremental workflows, the following fields are updated in the fileset table for that particular file:
1) Exclude_error: Is set to the error number encountered during deletion.

Figure 5:
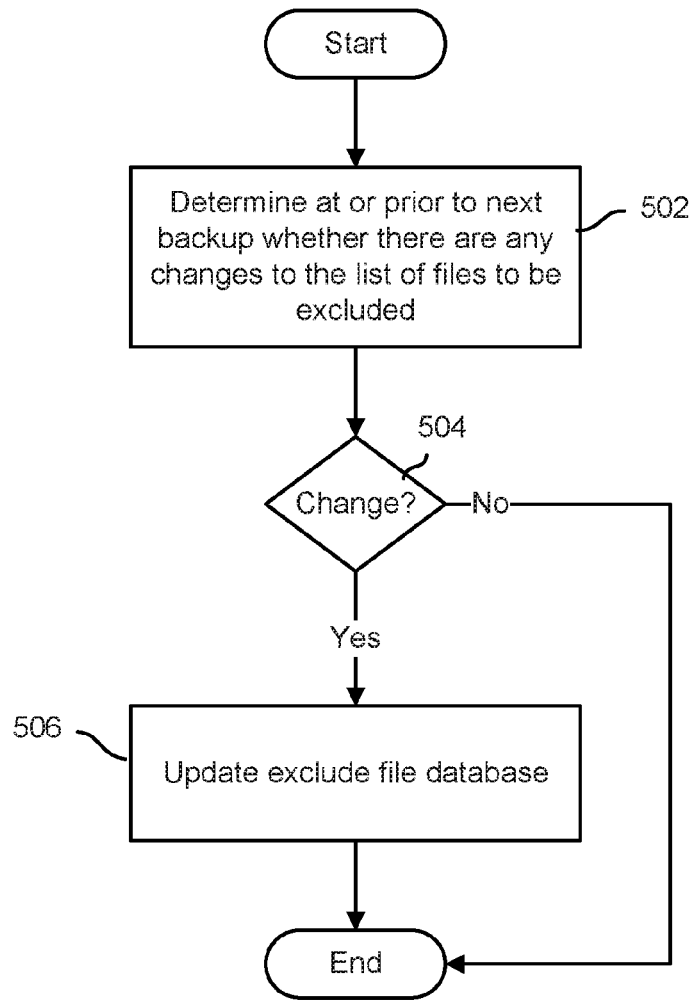
FIG. 5 is a flow chart illustrating an embodiment of a process to update a list of files desired to be excluded.

FIG. 5 is a flow chart illustrating an embodiment of a process to update a list of files desired to be excluded. In the example shown, at and/or prior to the start of a backup, it is determined whether any changes to the list of files desired to be excluded are required to be made (502). If so (504), the exclude file database is updated to reflect any changes (506), e.g., to add a file newly-indicated as being desired to be excluded. In some embodiments, in step 506 all the exclude set items specified by a user since a last backup are gathered and attempted to be inserted into the database. A COMBINED UNIQUE constraint on some of the fields of the exclude set table ensures that duplicate records are handled correctly and do not result in duplicate entries in the table.

Figure 6:
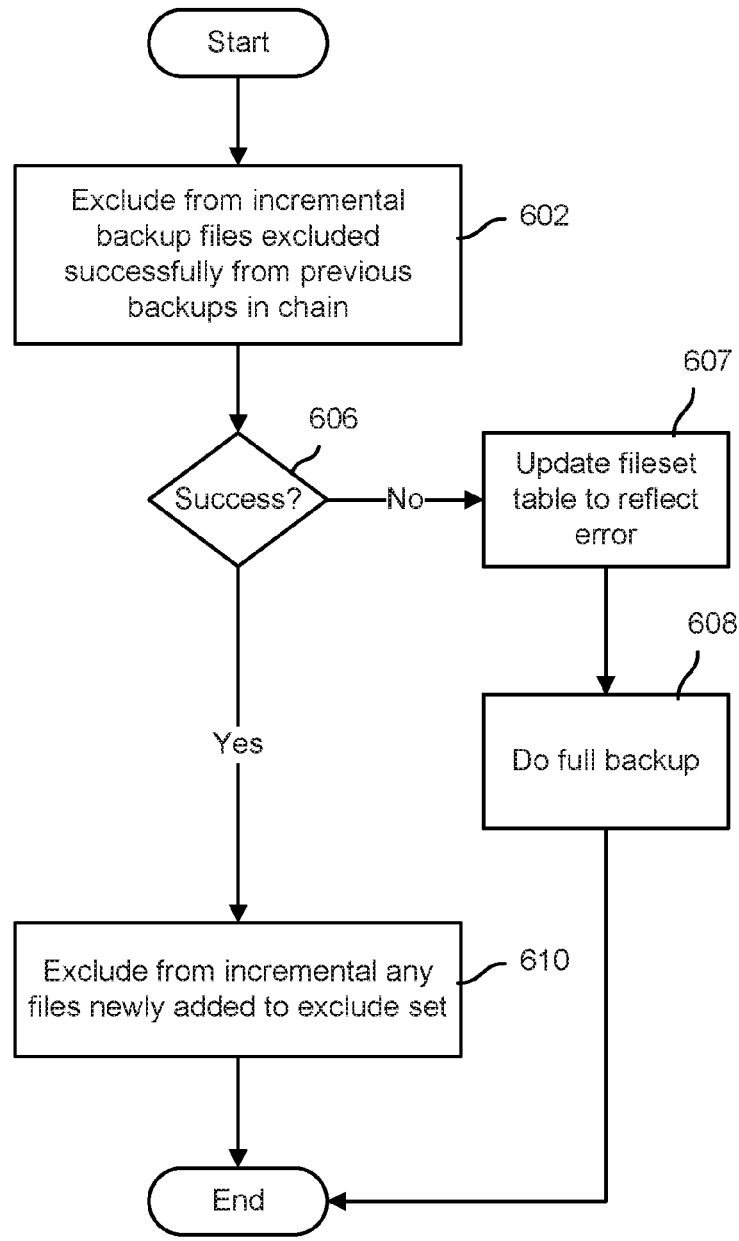
FIG. 6 is a flow chart illustrating an embodiment of an incremental backup process.

FIG. 6 is a flow chart illustrating an embodiment of an incremental backup process. In the example shown, an attempt is made to ensure that files excluded from a prior backup in a chain of backups on which the current incremental backup is based, e.g., a previous full or incremental backup, are excluded from the present incremental backup (602). If a file cannot be found and excluded in the incremental backup at a same location and filename as in the previous backup, an attempt is made to determine if the file has been moved to a new path. If not, the file likely has been deleted and a "file not found" error is set in the fileset table. If a new path is obtained but the file cannot be found and excluded (deleted) from the incremental backup using the new path, then the attempt to exclude from the current incremental backup files excluded from the previous backup fails (606), an "exclude error" field of the fileset table is updated to indicate the error returned by the operating system when the attempt to delete the file at the new path failed (607), and because consistency with prior backups on which the incremental backup is based cannot be ensured, the incremental backup is aborted and a full backup is performed instead (608). If all items excluded from the prior backup are excluded successfully, e.g., found and deleted from the incremental backup data or determined not to be found in the incremental data, e.g., because they were deleted in the source volume since the last backup (606), then an attempt is made to exclude from the current incremental backup any files newly-added to the list of files to be excluded from backup (610). Also old exclude set items are again processed i.e. the shadow copy is traversed looking for files that match the specified pattern and excluded, if successfully excluded then appropriate inserts to the exclude set database are made. If all files to be excluded from the incremental backup are excluded successfully, the process of FIG. 6 ends and the incremental backup is completed.

Using techniques disclosed herein, files can be excluded from full backups and from subsequent incremental backups reliably and while maintaining consistency across inter-dependent backups.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of excluding files from backup, comprising:
accessing, by one or more processors, a database that includes an exclude set table that stores data associated with one or more files identified to be excluded from backup in connection with an incremental backup, wherein the database is accessed in connection with performing an incremental backup at least in part by retrieving from the database an identification of one or more files excluded from a previous backup; and
using, by the one or more processors, at least the identification of one or more files excluded from the previous backup retrieved from the database to exclude one or more of the one or more files from the incremental backup, wherein the using of the data retrieved from the database to exclude one or more of the one or more files comprises:
- ensuring that data blocks associated with the one or more files excluded from the previous backup are excluded from the incremental backup; and
- aborting the incremental backup and performing instead a full backup based at least in part on a determination that one or more of the one or more files excluded from the previous backup could not be excluded from the incremental backup.

2. The method of claim 1, further comprising updating the database to reflect one or more of the one or more files were excluded from the backup.

3. The method of claim 2, wherein updating the database to reflect one or more of the one or more files were excluded from the backup includes storing in a file set table data identifying the one or more of the one or more files excluded from the backup.

4. The method of claim 1, wherein the one or more files are excluded from the backup at least in part by deleting the one or more files from a shadow copy volume created in connection with the backup.

5. The method of claim 1, wherein the database comprises a relational database.

6. The method of claim 1, further comprising receiving, via an administrative or other interface, an indication that the one or more files are to be excluded from the backup; and storing in the exclude set table the data associated with the one or more files identified to be excluded from backup.

7. The method of claim 1, further comprising a file set table included in the database with data identifying one or more excluded files which were excluded successfully from the backup.

8. The method of claim 1, further comprising receiving an update to a set of files to be excluded from backup and updating the exclude set table to reflect the update.

9. A system to exclude files from backup, comprising:
- a data storage device configured to store a database that includes an exclude set table that stores data associated with one or more files identified to be excluded from backup in connection with an incremental backup; and
- a processor coupled to the data storage device and configured to access the database and use at least the identification of one or more files excluded from the previous backup retrieved from the database to exclude one or more of the one or more files from the incremental backup, wherein the processor accesses the database in connection with performing an incremental backup at least in part by retrieving from the database an identification of one or more files excluded from a previous backup, and wherein the processor uses the data retrieved from the database to exclude one or more of the one or more files in connection with:
  - ensuring that data blocks associated with the one or more files excluded from the previous backup are excluded from the incremental backup; and
  - aborting the incremental backup and performing instead a full backup based at least in part on a determination that one or more of the one or more files excluded from the previous backup could not be excluded from the incremental backup.

10. The system of claim 9, wherein the processor is further configured to update the database to reflect one or more of the one or more files were excluded from the backup.

11. The system of claim 10, wherein updating the database to reflect one or more of the one or more files were excluded from the backup includes storing in a file set table data identifying the one or more of the one or more files excluded from the backup.

12. The system of claim 9, wherein the one or more files are excluded from the backup at least in part by deleting the one or more files from a shadow copy volume created in connection with the backup.

13. The system of claim 9, wherein the processor is further configured to receive, via an administrative or other interface, an indication that the one or more files are to be excluded from the backup; and to store in the exclude set table the data associated with the one or more files identified to be excluded from backup.

14. A computer program product embodied in a tangible, non-transitory computer readable storage medium, comprising computer instructions for:
- accessing a database that includes an exclude set table that stores data associated with one or more files identified to be excluded from backup in connection with an incremental backup, wherein the database is accessed in connection with performing an incremental backup at least in part by retrieving from the database an identification of one or more files excluded from a previous backup; and
- using at least the identification of one or more files excluded from the previous backup retrieved from the database to exclude one or more of the one or more files from the incremental backup, wherein the using of the data retrieved from the database to exclude one or more of the one or more files comprises:
  - ensuring that data blocks associated with the one or more files excluded from the previous backup are excluded from the incremental backup; and
  - aborting the incremental backup and performing instead a full backup based at least in part on a determination that one or more of the one or more files excluded from the previous backup could not be excluded from the incremental backup.

15. The computer program product of claim 14, wherein the one or more files are excluded from the backup at least in part by deleting the one or more files from a shadow copy volume created in connection with the backup.

16. The method of claim 2, wherein the database is updated to reflect one or more of the one or more files that were successfully excluded from backup during a backup operation.

17. The method of claim 7, wherein the file set table is populated after exclusion of data during backup such that the table stores information associated with files that are excluded from the backup.

* * * * *